Patented Nov. 27, 1951

2,576,807

UNITED STATES PATENT OFFICE 2,576,807

PROCESS FOR THE MANUFACTURE OF 4-NITRO - 1 - AMINONAPHTHALENE-5-SULFONIC ACID

Fritz Oesterlein, Basel, Switzerland, assignor to Ciba Limited, Basel, Switzerland, a Swiss firm No Drawing. Application January 30, 1950, Serial No. 141,342. In Switzerland March 25, 1949

3 Claims. (Cl. 260—508)

In German Patent No. 133,951 is described a process for the manufacture of 4-nitro-1-aminonaphthalene-5-sulfonic acid. This compound is obtained according to that process by nitrating 1-aminonaphthalene-5-sulfonic acid with sulfuric acid-nitric acid mixture at a temperature of 0° to 10° C. The product thus obtainable contains disturbing impurities and in the patent it is therefore recommended to purify the acid by conversion into the sodium salt. The yield of pure product is unsatisfactory.

The present invention is based on the observation that 4-nitro-1-aminonaphthalene-5-sulfonic acid is obtained by nitration of 1-aminonaphthalene-5-sulfonic acid directly in practically pure form and in good yield when the nitration is carried out at a temperature which lies below 0° C.

In carrying out the present process it is advantageous to proceed in such a manner that the 1-aminonaphthalene-1-sulfonic acid serving as starting material is dissolved in concentrated, for example in anhydrous, sulfuric acid, with cooling advantageously at a temperature which is not higher than +5°, the solution obtained is cooled to a temperature below 0° and then so-called mixed acid is allowed to flow in while care is taken by cooling and correspondingly slow addition of the mixed acid, that the temperature does not rise to 0° C. For security reasons it is to be recommended to carry out the nitration at a considerably lower temperature than 0° C., for example to commence the addition of the mixed acid at —10 to —8° C. and not to let the temperature of the reaction mixture rise above —2° C. until the introduction of the mixed acid is complete. (If the nitration takes place at a temperature which attains the upper limit of 0° C., the yield already becomes reduced to a marked extent.) By the term "mixed acid" is to be understood in this case a mixture which consists of concentrated sulfuric and concentrated nitric acid. For the nitration according to the present process with advantage a practically anhydrous mixed acid is employed which consists for example of equal parts by weight of nitric acid of highest concentration and anhydrous sulfuric acid (monohydrate). The theoretically necessary quantity of nitric acid produces very good results in this nitration and it is therefore to be recommended to employ no excess or only a very slight excess of nitric acid.

The working up of the reaction mixture when the nitration is complete can take place according to customary methods known per se, for example by pouring the mixture on ice, filtering off the precipitated 4 - nitro-1-aminonaphthalene-5-sulfonic acid, freeing it from adhering sulfuric acid by washing with concentrated sodium chloride solution and drying the practically pure product thus obtained.

It is surprising that in the present case where the known nitration at a temperature lying above 0° C. yields an impure product, the nitration at only slightly lower temperature, that is below 0° C., yields a practically pure product.

The following example illustrates the invention, the parts and percentages being by weight:

*Example*

111 parts of 1-aminonaphthalene-5-sulfonic acid are dissolved at 0 to 5° C. in 450 parts of 100 per cent sulfuric acid. The solution is cooled to —10 to —8° C. and within about one hour a mixture of 31.5 parts of about 99 per cent nitric acid and 31.5 parts of 100 per cent sulfuric acid added drop by drop, the temperature being maintained by cooling below —2° C.; 15 to 30 minutes after completion of the addition of the acid mixture the nitration is finished. Thereupon, or after standing for some time, the reaction mass is poured on about 2000 parts of ice, whereby the 4 - nitro - 1 - aminonaphthalene - 5-sulfonic acid produced precipitates in the form of small yellow crystals. It is filtered off, freed from mineral acid by washing with concentrated sodium chloride solution and can be dried, for example in vacuum. A practically pure product is obtained in very good yield (90 per cent of the theoretical or somewhat more).

Having thus described the invention, what is claimed is:

1. Process for the manufacture of 4-nitro-1-aminonaphthalene-5-sulfonic acid which comprises nitrating 1-aminonaphthalene-5-sulfonic acid at a temperature below —2° C.

2. Process for the manufacture of 4-nitro-1-aminonaphthalene-5-sulfonic acid which comprises nitrating 1-aminonaphthalene-5-sulfonic acid with mixed acid at a temperature below —2° C.

3. Process for the manufacture of 4-nitro-1-aminonaphthalene-5-sulfonic acid which comprises nitrating 1-aminonaphthalene-5-sulfonic acid with mixed acid at a temperature below —2° C. and in a medium which is practically anhydrous apart from the water produced in the reaction itself.

FRITZ OESTERLEIN.

REFERENCES CITED

The following references are of record in the file of this patent:

FOREIGN PATENTS

| Number | Country | Date |
|---|---|---|
| 133,951 | Germany | Sept. 6, 1902 |